Jan. 29, 1957 H. A. FRANZ ET AL 2,779,263
DEEP FURROW DRILL SHOVEL
Filed Oct. 15, 1953 2 Sheets-Sheet 1
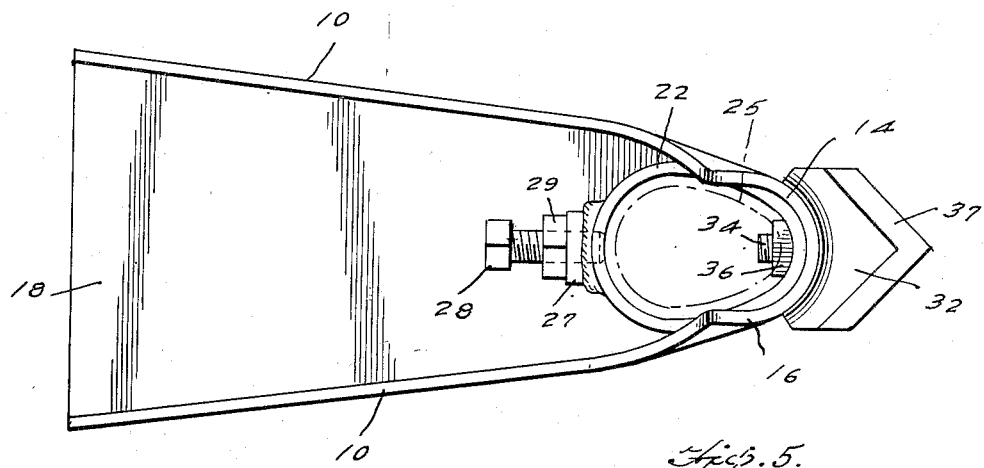
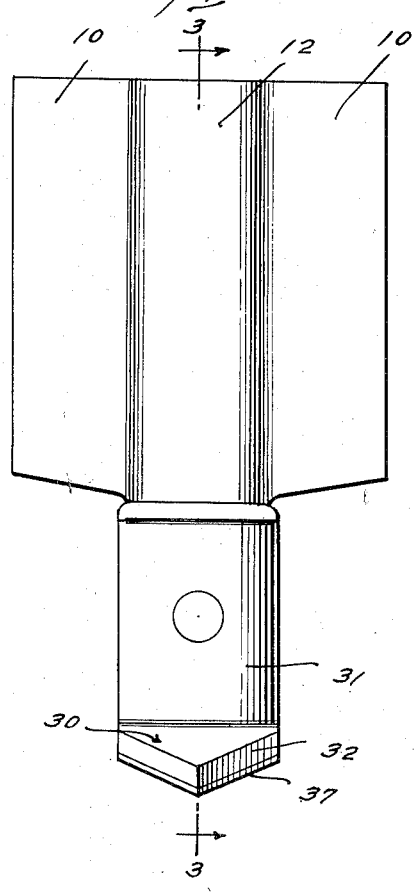
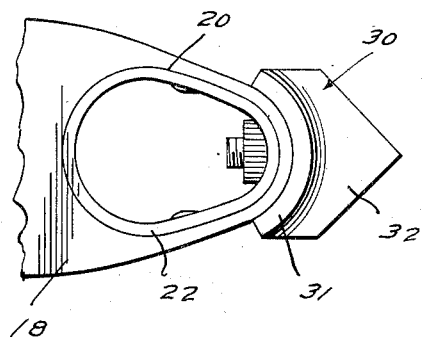
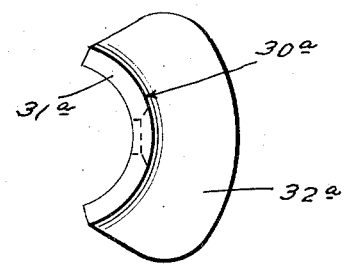
Inventors
Harold Franz
Herbert Franz
Earl Franz
By Wilfred E. Lawson
ATTY.

Jan. 29, 1957 H. A. FRANZ ET AL 2,779,263
DEEP FURROW DRILL SHOVEL
Filed Oct. 15, 1953 2 Sheets-Sheet 2
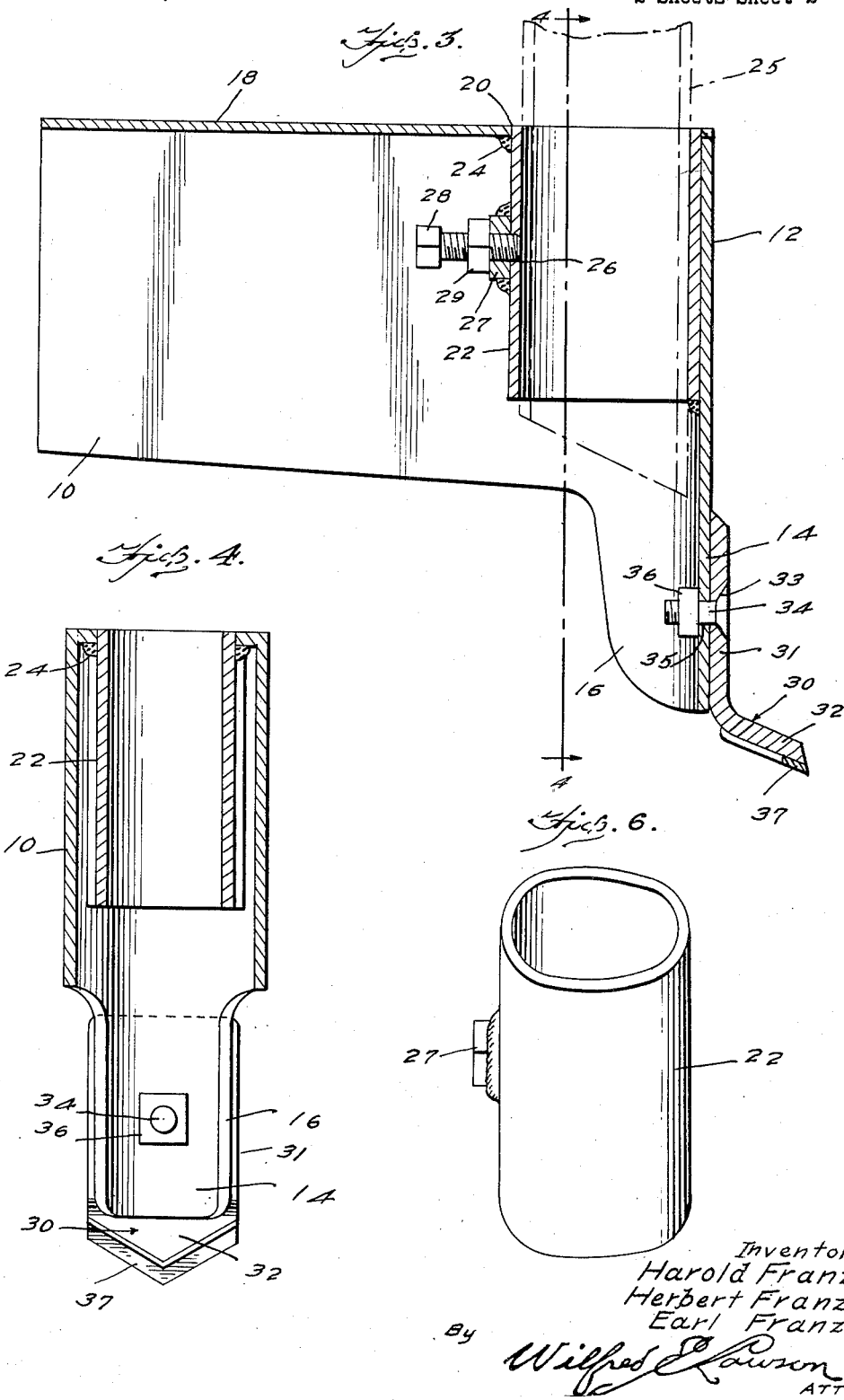
Inventors
Harold Franz
Herbert Franz
Earl Franz
By Wilfred Lawson
ATTY

United States Patent Office 2,779,263
Patented Jan. 29, 1957

2,779,263

DEEP FURROW DRILL SHOVEL

Harold Arthur Franz, Herbert William Franz, and Earl Melvin Franz, Marlin, Wash.

Application October 15, 1953, Serial No. 386,198

1 Claim. (Cl. 97—225)

This invention relates generally to improvements in agricultural equipment and is directed particularly to grain drills.

The principal object of the present invention is to provide an improved drill shovel for use on grain hoe drills of the type commonly known or referred to as "deep furrow drills," by means of which effective sub-moisture grain seeding or planting can be accomplished and, more particularly, a planted seed or grain covered by the moist sub-soil instead of being covered by the dry top soil as is commonly done with drill shovels of known type.

A further object of the invention is to provide an improved deep furrow drill shovel of novel construction wherein there is provided a sub-soil penetrating portion together with covered wing portions which function to prevent the entrance of dry top soil into the furrow on top of the planted seed before the seed can be covered by the moist sub-soil in which it is deposited by the shovel from the seed drill.

Still another object of the invention is to provide a drill shovel of the character stated which is designed in a novel manner whereby it can be readily fitted to drills of different manufacture or commercial makes.

Other objects and advantages of the invention will become apparent as the description of the same proceeds and the invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

In the drawings:

Figure 1 is a view in bottom plan of the drill shovel of the present invention showing in broken outline the position of a grain drill tube therein.

Figure 2 is a view in front elevation of the shovel.

Figure 3 is a sectional view taken in a vertical plane substantially on the line 3—3 of Figure 2.

Figure 4 is a transverse sectional view taken substantially on the line 4—4 of Figure 3.

Figure 5 is a view in top plan of the front end of the shovel.

Figure 6 is a view in perspective of the inner sleeve in which the grain drill tube is secured.

Figure 7 is a view of a modified type of shovel point.

Referring now more particularly to the drawings it will be seen particularly upon reference to Figure 1 that the present shovel structure comprises an elongate body having long side wings 10 which are arranged in forwardly convergent relation and are joined at the front by the rounded nose portion 12 which forms the advancing face of the shovel when in use.

This nose portion is extended downwardly a substantial distance beyond the bottom edges of the wings 10 forming the moist sub-soil penetrating extension 14 which at its sides joins the narrow rearwardly extending flanges 16 which flanges form integral continuations of the bottom forward edges of the wings 10 as is clearly shown in Figure 3.

The top of the shovel is covered by the plate 18 which joins the top edges of the wings 10 and at the forward end of the shovel this plate 18 is provided with the opening 20.

Disposed between the wings 10 and positioned against the rear face of the nose portion 12 is the sleeve 22, the upper end of which fits in the opening 20 as shown and the sleeve is secured in position by welding as at 24 or in any other suitable manner.

The sleeve 22 is of a length materially less than the height of the wings 10 and is designed to have extended thereinto from the top end, the lower end of the seed drill discharge tube which is shown in broken outlines in Figures 1 and 3 and designated 25.

The wall of the sleeve 22 is provided with a set screw opening 26 which, when the sleeve is secured in position in the shovel, is at the back of the sleeve and welded to the back part of the sleeve in line with the opening 26 is the nut 27 which received the set screw 28 which carries a lock nut 29, as shown in Figures 1 and 3.

The face or front of the nose extension 14 is transversely curved and positioned against this front face of the extension is the detachable point which is generally designated 30. This point comprises the vertical transversely curved shank portion 31 and, in the form illustrated in Figures 1 to 5, a downwardly and forwardly extending pointed spade portion 32.

The shank 31 is provided with a suitable opening 33 to receive a filister head bolt 34 which extends through a corresponding opening 35 formed in the shovel extension 14 and on the rear face of the extension the bolt 34 receives the securing nut 36 to hold the detachable point in position.

As shown, the spade portion 32 of the point 30 lies below the lower end of the extension 14 and extends at a downward and forward angle and the under face of the spade portion 32 is bordered by the reinforced or hard wear surfacing material 37.

Figure 7 illustrates a modified construction of the detachable point. In this figure the modified point is generally designated 30a and it comprises a shank 31a corresponding with the shank 31 and a spade portion which is generally designated 32a and which, instead of being pointed is of transversely arcuate form. The different style points are provided for use in accordance with the soil conditions and penetration desired.

In the use of the present drill shovel, the regular shovel which forms a standard part of drill equipment, is removed and the present shovel is applied by inserting the tube 25 of the seed drill apparatus into the sleeve 22, as shown in Figure 3, where it is secured by the set screw 28.

Different manufacturers of seed planting equipment make deep furrow drills and the present shovel device is adaptable to any of such drills merely by changing the shape and size of the sleeve 22.

In the use of the shovel the point 30 and the extension 14 operate in the moist soil or sub-moisture.

The purpose of the wings 10 of the main body of the shovel is to hold dry soil away from sub-moisture in sub-moisture seeding, until such time as wet soil has had time to come around the point 30 beneath the wings 10 of the main body of the shovel and cover the seed. The wings of the main body of the shovel also serve to build furrow and ridge which remain after seed is placed in the ground and are valuable in that the ridges direct subsequent moisture to the bottom of the furrow directly above the planted seed and also prevent wind soil erosion.

The top plate 18 connecting the top edges of the wings 10, serves as a shield to prevent any dry soil from falling on planted seed prior to the time it has been covered by moist soil, thus preventing a mixture of dry and moist soil, and also assists in creating a more nearly perfect furrow and ridge.

The important feature of the present invention resides in its ability to cover the seed with moist soil before the dry soil comes into contact with the seed. In other known deep furrow drills the seed is placed in the moist soil and is covered with the dry soil whereas with the present device the seed is placed in the moist soil and is covered with the moist soil before any dry soil comes in contact with the seed.

We claim:

In a drill shovel, an elongate body comprising a horizontal top plate tapering toward its forward end and having an opening adjacent to that end, wings depending from the side edges of said plate and extending forwardly in converging relation, the forward ends of the wings terminating short of the forward end of the plate, a rounded nose portion joined to the vertical edges of the converging end portions of said wings and having its lower end portion extending a distance below the bottom edges of said wings, a vertical sleeve within the nose portion with its upper end secured in the said opening in said plate, a downwardly and forwardly angled point secured against the outer side of the lower end portion of said nose portion, said sleeve being adapted for engagement on the discharge end of a grain drill tube, and means carried by said sleeve for securing said body to the drill tube.

References Cited in the file of this patent

UNITED STATES PATENTS

| | | |
|---|---|---|
| 604,814 | Ward | May 31, 1898 |
| 660,759 | Morphy | Oct. 30, 1900 |
| 848,565 | McMullin | Mar. 26, 1907 |
| 1,031,167 | Bushnell | July 2, 1912 |
| 1,438,583 | Curtiss | Dec. 12, 1922 |
| 1,607,102 | Schutter | Nov. 16, 1926 |
| 2,010,979 | Crawford | Aug. 12, 1935 |